Patented Nov. 11, 1941

2,262,741

UNITED STATES PATENT OFFICE 2,262,741

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, Mo., assignor to Petrolite Corporation, Ltd., Wilmington, Del., a corporation of Delaware No Drawing. Application October 11, 1940, Serial No. 360,804

34 Claims. (Cl. 166—21)

This invention relates to the art or procedure commonly referred to as acidization of oil-bearing calcareous strata or the like, and which consists in introducing a strong mineral acid into an oil well for the purpose of causing the acid to disintegrate, dissolve, or react with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical, or similar treatment, in order to recover the oil or valuable constituent of the emulsion. My invention has for its main object to prevent the formation of objectionable water-in-oil type emulsions resulting from acidization of oil wells; or stated in another way, one object of my invention is to provide a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions which often follow conventional acidization, represent a transitory, rather than a permanent situation; but even if lasting only for a few weeks, they are extremely objectionable.

Another object of my invention is to provide a new composition of matter that is particularly adapted for use in the operation of acidizing the calcareous structure in a way to increase the amount of crude petroleum obtainable from said structure, without, however, converting said crude petroleum into an objectionable emulsion.

My new process, briefly stated, consists in causing an emulsion-preventing agent of the kind hereinafter described, to be mixed with, dissolved in, or commingled with the fluids, liquids, or liquid mixture in an oil well that has been subjected to, or which is being subjected to acidization, prior to emergence of said fluids, liquids, or liquid mixtures from the well.

Said emulsion-preventing agent consists of a condensation product or chemical compound obtained by reaction between a higher molecular weight monocarboxy acid or its functional equivalent, and a polymerized polyamine derived from a hydroxylated polyamine containing at least one nitrogen atom not directly linked to a hydroxy hydrocarbon radical, and preferably, at least two amino nitrogen atoms not directly linked to a hydroxy hydrocarbon radical. Such reactants are mixed together so that there is at least one mole of the high molal carboxy acid for each mol of polymerized hydroxylated polyamine; and there may be several moles of such high molal carboxy acid combined with each mole of the polymerized hydroxylated amine. Such condensation is effected by the action of the heat generally at a temperature above 100° C., and may be conducted at a temperature as high as 300° C. Generally speaking, the range of 150–175° C. represents an optimum temperature. Preferably, condensation is conducted by first polymerizing such hydroxylated amines and then condensing the polymerized hydroxylated polyamine with the selected alcohol. Polymerization catalysts consist of materials of the kind commonly employed to polymerize hydroxylated monoamine, such as triethanolamine. They include materials such as caustic soda, caustic potash, high molal amines, soaps, sodium glycerate, sodium methylate, sodium ethylate, and the like. The amounts used vary from 1% to approximately 0.1% or even less. Polymerization is generally conducted at a temperature range of approximately 225–275° C. Constant stirring is desirable during polymerization, and condensation. Such condensation products are usually cation-active materials.

The detailed composition of the products obtained is not known, although in a general way, ester linkages must be involved.

As indicated, an amine may act as a catalyst; or, stated another way, the hydroxylated amine of the kind employed as a reactant in the production of the emulsion-preventing agent or condensation product, may act as its own polymerization catalyst. For instance, in condensation product Examples 1–8, inclusive, as described subsequently, the added catalyst may be eliminated or reduced, with probable increased time of condensation being required. Thus, in the hereto appended claims, reference to a catalyst is intended to include the amine itself, as well as an added catalyst, if employed. For this reason many of the properties of the materials are unpredictable.

It is surprising to find that such materials are stable for an extended period of time in half-concentrated hydrochloric acid or other similar mineral acids. It is likewise remarkable to note that such solutions in acid, and particularly in relatively low ratios, as hereinafter described, give a very pronounced lowering of the surface tension. This is especially true in such compounds or condensation products that are derived at relatively high temperatures, and especially if derived from polyamino reactants, having at least two amino nitrogen atoms not directly linked to a hydroxy hydrocarbon radical. It is difficult to indicate a detailed probable structure for such compounds which would account for their resistance to decomposition in strong acid solution.

In practising my process the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well, or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent along with the mineral acid, i. e., dissolved in said acid; and (c) Introducing the emulsion-preventing agent, preferably in aqueous solution immediately after the introduction of the mineral acid.

The composition of matter that I have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. My preference is to use hydrochloric acid whose concentration is at least equal to approximately half strength commercial 18 Bé. acid, as I have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, I wish it to be understood that my invention, i. e., the process and composition of matter herein described, is not restricted to the use of hydrochloric acid, but instead, contemplates the use of any suitable strong mineral acid, several of which have previously been described as being usable in place of hydrochloric acid. Similarly, I wish it to be understood that the new composition of matter herein described may have other or additional uses, such, for example, as in the acidization of oil-bearing strata, which do not produce emulsions. The hydrochloric acid or the like that is employed may or may not have present other addition agents intended to make the acid particularly adapted to most localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of same, with siliceous material, or material which is dolomitic in character, and commonly referred to as calcareous structures. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art related to acidization, although there are in addition certain other practical elements which are well known:

U. S. Patents No. 1,877,504, dated Sept. 13, 1932, Grebe and Sanford; 1,891,667, Dec. 20, 1932, Carr; 1,911,446, May 20, 1933, Grebe and Sanford; 1,990,969, Feb. 12, 1935, Wilson; 2,011,579, Aug. 20, 1935, Heath and Fry; 2,024,718, Dec. 17, 1935, Chamberlain; 2,038,956, Apr. 28, 1936, Parkhurst; 2,053,285, Sept. 8, 1936, Grebe; 2,128,160, Aug. 23, 1938, Morgan; 2,128,161, Aug. 23, 1938, Morgan; 2,161,085, June 6, 1939, Phalen.

As has been previously stated, in the acidization of oil-bearing calcareous strata or the like, it has been found necessary, in some instances, to add certain other materials or compounds which give additional desirable effects, at least under certain conditions. For instance, hydrofluoric acid or fluorides, have been added to intensify the action of the hydrochloric acid used to treat the well. Possibly, this is related to the action on siliceous matter in the calcareous structure. The reason for the addition of inhibitors has been previously indicated. Sometimes it has been desirable to add tenacious foam-producing agents, such as glue, gelatin, or the like. In other instances, it has been desirable to add calcium sequestering compounds, such as sodium hexametaphosphate. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

I have found that the materials or products which I contemplate adding to the hydrochloric acid or the like to produce my new composition of matter, or to act as an emulsion-preventing agent in my new process, do not interfere in any manner with the functional effect of other conventional acidizing addition agents. Of course, any single example may contain no additional agent at all; it may contain one or more, depending upon the particular local conditions and use. As far as I am aware, the herein-contemplated compounds which are added to hydrochloric acid, or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production after the acidizing operation. Many oil wells are acidized without subsequently producing any emulsions; or the emulsions, if produced, are self-resolving or readily susceptible to any moderate breaking action. However, certain wells, particularly those located in western Kansas and certain wells in Iillinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength or somewhat weaker, is usually diluted with an equal quantity of water before it is used for acidization; i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit: 0.01% and 2.5%. In many instances, the use of between 0.05% and 0.5% represents an acceptable average range.

In actual practice the hydrochloric acid obtained by a person or firm responsible for acidizing operations, may be used, in some instances, on oil-bearing strata, which do not form severe or refractory emulsions, and thus no advantage is obtained by adding a composition of the kind herein contemplated in comparison with ordinary acid. Then too, some calcareous oil-bearing strata which produces severe emulsions, may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-preventing agent that I employ, and without danger of said emulsion-preventing agent interfering with the effectiveness of such other acidization addition products. Likewise, it has been indicated that one need not necessarily employ my emulsion-preventing agent in the form of an addition agent, which is added to or mixed with the acid used in the acidizing step. Instead, my emulsion-preventing agent may be introduced in suitable aqueous solution, preferably in fairly concentrated solution, for instance, 1-5%, prior to the acidizing step, or immediately after the acidizing step. The method of introduction is, of course, any conventional method, and preferably, employs the same apparatus and procedure used for introducing the acid. For convenience, however, and in the most preferred form, my invention is exemplified by employing as an integral part thereof the composition of matter herein contemplated, to wit, hydrochloric acid or the like, containing in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing roughly the equivalent of 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of my new composition of matter herein described make it adaptable for use in other arts with which I am not acquainted; but it may be apparent to others. It is also possible that the stable mixture of the kind described, i. e., certain agents dissolved in strong mineral acid, have other properties which we have not investigated, and in view of such properties, such mixture is particularly adaptable for the particular use herein described.

As has been stated, materials of the kind herein contemplated as emulsion-preventing agents, are derived from various reactants. One class of reactants consists of higher molecular weight carboxy acids, and particularly, monocarboxy acids or their functional equivalents, such as the acyl halide, ester, amide, etc. The expression "higher molecular weight carboxy acids" is an expression frequently employed to refer to certain organic acids, particularly monocarboxy acids, having more than 6 carbon atoms, and generally less than 40 carbon atoms. The commonest examples include the detergent-forming acids, i. e., those acids which combine with alkalies to produce soap or soap-like bodies. The detergent-forming acids, in turn, include naturally-occurring fatty acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic aliphatic and fatty acids, such as dihydroxystearic acid, dihydroxy palmitic acid, dihydroxy-behenic acid, alphahydroxy capric acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroabietic acid; aralkyl and aromatic acids, such as benzoic acid, Twitchell fatty acids, naphthoic acid, carboxydiphenyl pyridine carboxylic acid, hydroxybenzoic acid, and the like. Other suitable acids include phenylstearic acid, benzoylnonylic acid, cetyloxyacetic acid, chlorstearic acid, fencholic acid, cetyloxybutyric acid, etc.

Insofar that the fatty acids are preferably employed as a source of the acyl radical, obviously one need not use the fatty acids themselves, but may employ any obvious functional equivalent, such as an ester, anhydride, amide, acyl halide, etc. It is understood that in the hereto appended claims reference to formation of a condensation product being derived from an acid is intended to include such obvious functional equivalents. In such instances, instead of elimination of water, one may have some other compound, such as ammonia or hydrochloric acid, eliminated.

As has been previously indicated, the second class of reactants is obtained by polymerization of certain hydroxylated polyamines.

Such hydroxylated polyamines characterized by the presence of at least one amino nitrogen atom not directly attached to a hydroxy hydrocarbon radical, are well known compounds. They may be obtained in various ways. The commonest procedure is to treat a polyamine with an alkylene oxide or its equivalent, such as ethylene oxide, propylene oxide, glycidol, or the like. The commoner polyamines which can be so treated with an oxy-alkylating agent include the following: ethylene diamine; diethylene triamine; triethylene tetramine; tetraethylene pentamine; pentaethylene hexamine; propylene diamine; dipropylene triamine; tripropylene tetramine; tetrapropylene pentamine; pentapropylene hexamine, etc. In some instances such amines may be treated with an alkylating agent or the like so as to introduce an alkyl, aralkyl, or alicyclic radical into the compound as a substitute for an amino hydrogen atom. For instance, one may obtain diethyl tetraethylene pentamine in the conventional manner, using ethyl iodide or the like as an alkylating agent.

In any event, having selected a suitable polyamine, the product is then treated with any acceptable oxy-alkylating agent, such as ethylene oxide, propylene oxide, and the like. In view of the lower cost of ethylene oxide and in view of its greater activity, it is most frequently employed. For instance, ethylene diamine can be treated with one mole of ethylene oxide to produce hydroxy ethylene diamine. Diethylene triamine can be treated with three moles of ethylene oxide so as to yield triethanol diethylene triamine. Triethylene tetramine can be treated with four moles of ethylene oxide to yield tetraethanol triethylene tetramine. Similarly, one can obtain tetraethanol tetraethylene pentamine, or tetraethanol pentaethylene hexamine. One can employ propylene oxide or glycidol to give similar products. In view of the fact that the most inexpensive polyamine now available is tetraethylene pentamine, I prefer to treat tetraethylene pentamine with three moles, four moles, or five moles of ethylene oxide to give the corresponding triethanol, tetraethanol, and pentaethanol derivatives and to employ such derivatives.

In the manufacture of the emulsion-preventing agent or condensation agent of the kind herein contemplated, it is sometimes desirable to add a polyhydric alcohol, such as glycerol, ethylene glycol, diethylene glycol, diglycerol, propylene glycol, or the like. The effect of adding such polyhydric alcohol is essentially the same effect as would be obtained by treating the high molal alcohol with an alkylene oxide, such as ethylene oxide, propylene oxide, glycidol, or the like, or treating the unpolymerized hydroxylated amine in a similar manner, or treating the polymerized hydroxylated amine in a kindred fashion.

In view of the numerous reactants which have been indicated, it is obvious that one can obtain a variety of condensation products or emulsion-preventing reagents. If a compound or emulsion-preventing agent is not soluble enough, its solubility, or the solubility of its salt, can be increased in various manners, for instance:

(a) Employ a monocarboxy acid having a lower molecular weight;

(b) Use fewer moles of acid per mole of original unpolymerized polyamine;

(c) Select as a raw material an amine having a greater number of amino nitrogen atoms;

(d) Select as a raw material an amine having greater number of hydroxy hydrocarbon radicals;

(e) Select as an amine a compound having both an increased number of nitrogen atoms and an increased number of hydroxy hydrocarbon radicals;

(f) Add a polyhydric alcohol, such as glycerol, at some selected stage subsequently indicated;

(g) Vary the degree of polymerization of the hydroxylated amine in the manner subsequently indicated.

Inversely, it will sometimes happen that the condensation product or emulsion-preventing agent is too soluble; or, to state the matter another way, it does not possess sufficient surface activity for the purpose intended. In such instances it may be desirable to decrease the hydrophile properties. It is unnecessary to remark that this requires only a reversal of one or more of the procedures previously enumerated. It is believed that in view of what has been said, the compounds of the kind contemplated can be prepared without further directions or illustrations. However, for the purpose of indicating the preferable type of condensation product or emulsion-preventing agent, attention is directed to the following examples:

*Polymerized hydroxylated polyamine, Example 1*

Triethylene tetramine is treated with four moles of ethylene oxide to produce tetraethanol triethylene tetramine. Approximately three-fourths of a percent of caustic soda is added to this material by weight and the hydroxylated amine is heated for approximately two to four hours at about 245–260° C. The mass is stirred constantly and any distillate is condensed and reserved for re-use after an intermediate re-running step. As polymerization takes place, as indicated by elimination of water and increase in viscosity of the residual mass, cryoscopic molecular weight determinations are made on the polyamine or a suitable salt, such as the acetate, or the like, and polymerization is stopped when such molecular weight determinations indicate that the material based on average values is largely dimeric.

*Polymerized hydroxylated polyamine, Example 2*

The same procedure is employed as in the previous example, except that heating is conducted for approximately 1–3 hours longer. Tests are made in the same manner as previously indicated, and polymerization is stopped when determinations indicate that the average molecular weight is equivalent to a trimeric product.

*Polymerized hydroxylated polyamine, Example 3*

The same procedure is followed as in Example 2, preceding, except that a slightly higher temperature is employed, 'i e., about 10° higher, and if need be, a slightly longer time; and the process is continued until the product indicates an average molecular weight equal to or exceeding that of a tetramer.

*Polymerized hydroxylated polyamine, Example 4*

The preceding examples are repeated, adding one mole of glycerol for each mole of hydroxylated amine employed.

*Polymerized hydroxylated polyamine, Example 5*

Examples 1–3, inclusive, are repeated, adding two moles of glycerol for each mole of hydroxylated polyamine employed.

*Polymerized hydroxylated polyamine, Example 6*

Tetraethanol pentaethylene hexamine is substituted for tetraethanol tetraethylene tetramine in Examples 1–5.

*Polymerized hydroxylated polyamine, Example 7*

Tetraethanol tetraethylene pentamine is substituted for tetraethanol pentaethylene hexamine in the preceding example.

*Polymerized hydroxylated polyamine, Example 8*

Pentaethanol tetraethylene pentamine is substituted for tetraethanol tetraethylene pentamine in the preceding example.

*Polymerized hydroxylated polyamine, Example 9*

Hexa-ethanol tetraethylene pentamine is substituted for pentaethanol tetraethylene pentamine in the previous example.

The mixture of such reactants, i. e., the polymerized hydroxylated amine and the high molal carboxy acid or its equivalent, are prepared in such ratio that there is present at least one mole of the high molal fatty acid or its equivalent for each mole of polymerized amine. My preference is to use a dimeric, trimeric, or tetrameric form of the polymerized hydroxylated amine. My preference also is to use a fatty acid, rather than any other type of monocarboxy acid, and particularly to employ unsaturated fatty acids, such as soyabean fatty acids, teaseed oil fatty acids, corn oil fatty acids, and the like. The most desirable unsaturated fatty acid appears to be ricinoleic acid. It is used, if desired, in a more available form, to wit, the glyceride. In other words, in subsequent Example 1 and succeeding examples, it is really preferable to substitute one pound mole of triricinolein (castor oil) for three pound moles of ricinoleic acid.

The temperature of condensation has previously been indicated. In a general way, it is above 100° C.; but any temperature below the point of decomposition of the hydrotropic condensation materials may be employed. Although the preferred range indicated in succeeding examples is 150–175° C., in many instances very valuable reagents are obtained by using a considerably higher temperature, to wit, 250–300° C.

*Condensation product, Example 1*

A mixture is prepared using one pound mole each of the following: ricinoleic acid and a material of the kind exemplified by polymerized hydroxylated polyamine, Example 1. The products are mixed and stirred constantly, holding the temperature at approximately 150–175° C., until no unreacted high molal acid remains. The bulk of such high molal acid generally disappears within two to three hours; but sometimes it is necessary to heat from 4 to 6 or even 10 hours to obtain substantially complete reaction. The final completion of reaction is indicated in various ways, and usually by the fact that the product gives a clear solution in dilute acetic acid.

*Condensation product, Example 2*

One pound mole of ricinoleic acid in Example 1 above is replaced by two pound moles.

*Condensation product, Example 3*

Oleic acid is used instead of ricinoleic acid in Examples 1 and 2 preceding.

*Condensation product, Example 4*

Abietic acid is used instead of ricinoleic acid in Examples 1 and 2 preceding.

Condensation product, Example 5

Napththenic acid is used instead of ricinoleic acid in Examples 1 and 2 preceding.

Condensation product, Example 6

The examples of the type previously indicated are repeated with the addition of one pound mole of glycerol for each pound mole of the high molal alcohol.

Condensation product, Example 7

Example 6 is repeated using two pound moles of glycerol in each instance instead of one pound mole.

Condensation product, Example 8

Examples 1-7 preceding are repeated using polymerized hydroxylated polyamines Examples 2-9, instead of Example 1, as in the previous examples.

It is to be noted that the expression "condensation product" has been used to indicate a compound derived from one mole of a polymerized hydroxylated amine of the kind described, and at least one mole of a high molal, water-insoluble acid of the kind described.

All the chemical compounds previously described are water-soluble, as such, or when dissolved in dilute acid, or acid of the concentration indicated. Such compounds may be combined not only with mineral acids, but also with organic acids, such as acetic acid, lactic, stearic acid, or the like. For this reason they can be used without difficulty in aqueous solution as an emulsion-prevention agent by injecting such aqueous solution into the oil-bearing strata prior to acidization, or immediately after acidization. Such injection is made by conventional means, as, for example, the same apparatus or mechanical device employed for injecting acid into the well or oil-bearing strata. Furthermore, substantially all the compounds above described are soluble in hydrochloric acid of a strength corresponding to approximately 15%. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22 Bé., corresponding to approximately 35.2% anhydrous acid. Some commercial hydrochloric acid is available in a strength which approximates the C. P. grade, or slightly less than 37% anhydrous acid.

Needless to say, my new composition of matter can be prepared readily in any convenient form. The expression "new composition of matter" in this present instance is intended to refer to the combination or mixture obtained by combining materials of the kind described with hydrochloric acid or the like.

The selected compound may be dissolved in concentrated hydrochloric acid without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to add the particular chemical compound which has been selected as the emulsion-preventing agent. The percentage of chemical compound of the kind herein described is added within the range of 0.01% to 5%.

In the hereto appended claims, reference to the use of the condensation product is intended to include the base form, i. e., the chemical combination of water, and also the salt form, such as the lactate, acetate, citrate, or the like.

It has been previously pointed out that a large variety of the materials herein described represents surface-active materials, or more specifically, cation-active material. There is a wide variety of uses for surface-active materials. See, for example, U. S. Patent No. 2,174,131, dated September 26, 1939, to Lubs. Some of these purposes are particularly adapted to the use of a cation-active material, or a cation-active material which is at least self-emulsifiable. Briefly, then, specific uses for my product include use as wetting, detergent, and leveling agents in the laundry, textile, and dyeing industry as wetting agents and detergents in the acid washing of fruit and in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides and insecticides; and emulsifiers for cosmetic, spray oils, water-repellent textile finish, etc. These uses are by no means exhaustive. The products may be used as demulsifiers in the manner that such materials are most widely used in the production of crude oil or removal of salt in refinery practice.

Products of the kind herein contemplated may be considered as intermediate products and may be reacted with other materials, particularly dibasic acids, or fractional salts or esters thereof, such as oxalic acid, maleic acid, phthalic acid, oxalic acid, sodium acid phthalate, octyl acid phthalate, triricinolein monophthalate, triricinolein diphthalate, and the like, to give valuable products which may be used for the various purposes enumerated in the preceding paragraph.

I have found that the particular chemical compounds or reagents herein employed as emulsion-preventing agents may also be used for other purposes, for instance, as a break inducer in doctor treatment of the kind intended to sweeten gasoline. See U. S. Patent No. 2,157,223, dated May 9, 1939, to Sutton.

Having thus described my invention, what I claim as new and desire to secure by Letters Patent is:

1. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxyhydrocarbon radical, and at least one mole of a higher molecular weight monocarboxy acid containing at least 8 carbon atoms.

2. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a detergent-forming acid containing at least 8 carbon atoms.

3. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a fatty acid containing at least 8 carbon atoms.

4. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of an unsaturated fatty acid containing at least 8 carbon atoms.

5. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least two amino nitrogen atoms not directly linked to a hydroxy-hydrocarbon radical, and at least one mole of an unsaturated fatty acid containing at least 8 carbon atoms.

6. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyethylene amine containing at least two amino nitrogen atoms not directly linked to a hydroxy-hydrocarbon radical, and at least one mole of an unsaturated fatty acid containing at least 8 carbon atoms.

7. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from tetraethanol tetraethylene pentamine and at least one mole of an unsaturated fatty acid containing at least 8 carbon atoms.

8. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from pentaethanol tetraethylene pentamine and at least one mole of an unsaturated fatty acid containing at least 8 carbon atoms.

9. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a higher molecular weight monocarboxy acid containing at least 8 carbon atoms, and at least one mole of a polyhydric alcohol.

10. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a detergent-forming acid containing at least 8 carbon atoms, and at least one mole of a polyhydric alcohol.

11. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a fatty acid containing at least 8 carbon atoms, and at least one mole of a polyhydric alcohol.

12. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of an unsaturated fatty acid containing at least 8 carbon atoms, and at least one mole of a polyhydric alcohol.

13. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyalkylene amine containing at least two amino nitrogen atoms not directly linked to a hydroxy-hydrocarbon radical, at least one mole of an unsaturated fatty acid containing at least 8 carbon atoms, and at least one mole of a polyhydric alcohol.

14. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from a hydroxylated polyethylene amine containing at least two amino nitrogen atoms not directly linked to a hydroxy-hydrocarbon radical, at least one mole of an unsaturated fatty acid containing at least 8 carbon atoms, and at least one mole of a polyhydric alcohol.

15. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from tetraethanol tetraethylene pentamine, at least one mole of an unsaturated fatty acid containing at least 8 carbon atoms, and at least one mole of a polyhydric alcohol.

16. A process for preventing water-in-oil emulsions resulting from the acidization of calcareous oil-bearing strata, which consists in introducing into the cognate fluids of a well prior to emergence, the condensation product derived from one mole of a polymerized amine obtained by heat polymerization in presence of a catalyst, from pentaethanol tetraethylene pentamine, at least one mole of an unsaturated fatty acid containing at least 8 carbon atoms, and at least one mole of a polyhydric alcohol.

17. A composition of matter, comprising strong mineral acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a higher molecular weight monocarboxy acid containing at least 8 carbon atoms.

18. A composition of matter, comprising hydrochloric acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a higher molecular weight monocarboxy acid containing at least 8 carbon atoms.

19. A composition of matter, comprising hydrochloric acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a detergent-forming acid containing at least 8 carbon atoms.

20. A composition of matter, comprising hydrochloric acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, and at least one mole of a fatty acid containing at least 8 carbon atoms.

21. A composition of matter, comprising hydrochloric acid and the condensation product derived from one mole of a polymerized amine obtained by heat polymerization in presence of a catalyst from a hydroxylated polyalkylene amine containing at least one amino nitrogen atom not directly linked to a hydroxy-hydrocarbon radical, and at least one mole of an unsaturated fatty acid containing at least 8 carbon atoms.

22. A composition of matter, comprising hydrochloric acid and the condensation product derived from one mole of a polymerized amine obtained by heat polymerization in presence of a catalyst, from a hydroxylated polyalkylene amine containing at least two amino nitrogen atoms not directly linked to a hydroxy-hydrocarbon radical, and at least one mole of an unsaturated fatty acid containing at least 8 carbon atoms.

23. A composition of matter, comprising hydrochloric acid and the condensation product derived from one mole of a polymerized amine obtained by heat polymerization in presence of a catalyst, from a hydroxylated polyethylene amine containing at least two amino nitrogen atoms not directly linked to a hydroxy-hydrocarbon radical, and at least one mole of an unsaturated fatty acid containing at least 8 carbon atoms.

24. A composition of matter, comprising hydrochloric acid and the condensation product derived from one mole of a polymerized amine obtained by heat polymerization in presence of a catalyst, from tetraethanol tetraethylene pentamine and at least one mole of an unsaturated fatty acid containing at least 8 carbon atoms.

25. A composition of matter, comprising hydrochloric acid and the condensation product derived from one mole of a polymerized amine obtained by heat polymerization in presence of a catalyst, from pentaethanol tetraethylene pentamine and at least one mole of an unsaturated fatty acid containing at least 8 carbon atoms.

26. A composition of matter, comprising strong mineral acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a higher molecular weight monocarboxy acid containing at least 8 carbon atoms, and at least one mole of a polyhydric alcohol.

27. A composition of matter, comprising hydrochloric acid and the condensation product derived from one mole of a polymerized amine obtained by heat polymerization, in presence of a catalyst, from a hydroxylated polyalkylene amine containing at least one amino nitrogen atom not directly linked to a hydroxy-hydrocarbon radical, at least one mole of a higher molecular weight monocarboxy acid containing at least 8 carbon atoms, and at least one mole of a polyhydric alcohol.

28. A composition of matter, comprising hydrochloric acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a detergent-forming acid containing at least 8 carbon atoms, and at least one mole of a polyhydric alcohol.

29. A composition of matter, comprising hydrochloric acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of a fatty acid containing at least 8 carbon atoms, and at least one mole of a polyhydric alcohol.

30. A composition of matter, comprising hydrochloric acid and the condensation product derived from one mole of a polymerized amine obtained by heat polymerization in presence of a catalyst, from a hydroxylated polyalkylene amine containing at least one amino nitrogen atom not directly linked to a hydroxy-hydrocarbon radical, at least one mole of an unsaturated fatty acid containing at least 8 carbon atoms, and at least one mole of a polyhydric alcohol.

31. A composition of matter, comprising hydrochloric acid and the condensation product derived from one mole of a polymerized amine obtained by heat polymerization in presence of a catalyst, from a hydroxylated polyalkylene amine containing at least two amino nitrogen atoms not directly linked to a hydroxy-hydrocarbon radical, at least one mole of an unsaturated fatty acid containing at least 8 carbon atoms, and at least one mole of a polyhydric alcohol.

32. A composition of matter, comprising hydrochloric acid and the condensation product derived from one mole of a polymerized amine obtained by heat polymerization in presence of a catalyst, from a hydroxylated polyethylene amine containing at least two amino nitrogen atoms not directly linked to a hydroxy-hydrocarbon radical, at least one mole of an unsaturated fatty acid containing at least 8 carbon atoms, and at least one mole of a polyhydric alcohol.

33. A composition of matter, comprising hydrochloric acid and the condensation product derived from one mole of a polymerized amine obtained by heat polymerization in presence of a catalyst, from tetraethanol tatraethylene pentamine, at least one mole of an unsaturated fatty acid containing at least 8 carbon atoms, and at least one mole of a polyhydric alcohol.

34. A composition of matter, comprising hydrochloric acid and the condensation product derived from one mole of a polymerized amine obtained by heat polymerization in presence of a catalyst, from pentaethanol tetraethylene pentamine, at least one mole of an unsaturated fatty acid containing at least 8 carbon atoms, and at least one mole of a polyhydric alcohol.

MELVIN DE GROOTE.